(12) United States Patent
Wodrich

(10) Patent No.: US 12,071,084 B2
(45) Date of Patent: Aug. 27, 2024

(54) VEHICULAR SENSING SYSTEM WITH VARIABLE POWER MODE FOR THERMAL MANAGEMENT

(71) Applicant: Magna Electronics Inc., Auburn Hills, MI (US)

(72) Inventor: Helmut Arnold Hardow Wodrich, Clarkston, MI (US)

(73) Assignee: Magna Electronics Inc., Auburn Hills, MI (US)

(*) Notice: Subject to any disclaimer, the term of this patent is extended or adjusted under 35 U.S.C. 154(b) by 680 days.

(21) Appl. No.: 17/248,892

(22) Filed: Feb. 12, 2021

(65) Prior Publication Data

US 2021/0253048 A1 Aug. 19, 2021

Related U.S. Application Data

(60) Provisional application No. 62/976,574, filed on Feb. 14, 2020.

(51) Int. Cl.
*G01S 7/48* (2006.01)
*B60R 16/03* (2006.01)
*G01S 7/481* (2006.01)
*G01S 17/931* (2020.01)

(52) U.S. Cl.
CPC ............ *B60R 16/03* (2013.01); *G01S 7/4815* (2013.01); *G01S 17/931* (2020.01)

(58) Field of Classification Search
None
See application file for complete search history.

(56) References Cited

U.S. PATENT DOCUMENTS

| 6,587,186 B2 | 7/2003 | Bamji et al. |
| 6,674,895 B2 | 1/2004 | Rafii et al. |
| 6,678,039 B2 | 1/2004 | Charbon |
| 6,690,354 B2 | 2/2004 | Sze |
| 6,710,770 B2 | 3/2004 | Tomasi et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |

(Continued)

FOREIGN PATENT DOCUMENTS

| DE | 102008043481 A1 * | 5/2010 | ............. G01S 17/89 |
| JP | 04355390 A * | 6/1991 | ............... G01S 7/48 |

Primary Examiner — Hovhannes Baghdasaryan
(74) Attorney, Agent, or Firm — HONIGMAN LLP

(57) ABSTRACT

A method for managing power consumption for a vehicular lidar sensing system includes providing power to each lidar sensor of one or more lidars of the lidar sensing system. Each lidar has a corresponding field of sensing exterior of the vehicle. A speed of the vehicle is determined as the vehicle travels along a road, and electrical power is provided to the lidar sensor of the vehicular lidar sensing system as the vehicle travels along a road. An initial level of electrical power is determined for the lidar sensor based on the determined speed of the vehicle. A change in a driving condition is determined and, responsive to the determined change in driving condition, the electrical power provided to the lidar sensor is adjusted.

28 Claims, 2 Drawing Sheets

(56) References Cited

U.S. PATENT DOCUMENTS

| | | |
|---|---|---|
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 9,761,142 B2 | 9/2017 | Pflug |
| 2001/0052844 A1* | 12/2001 | Shirai .................... B60Q 9/008 340/436 |
| 2002/0071126 A1* | 6/2002 | Shirai .................... G01S 17/931 356/614 |
| 2010/0245066 A1 | 9/2010 | Sarioglu et al. |
| 2010/0277713 A1* | 11/2010 | Mimeault ............... G01S 17/10 356/5.01 |
| 2015/0009485 A1* | 1/2015 | Mheen ................. G01S 7/4817 356/4.01 |
| 2015/0041598 A1* | 2/2015 | Nugent .................... B64B 1/50 244/53 R |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0059228 A1* | 3/2018 | Raina ..................... G01S 17/04 |
| 2018/0113200 A1* | 4/2018 | Steinberg ........... G02B 26/0858 |
| 2018/0164439 A1* | 6/2018 | Droz ...................... G01S 17/89 |
| 2018/0231635 A1 | 8/2018 | Woehlte |
| 2023/0014401 A1 | 1/2023 | Hess et al. |

\* cited by examiner

VEHICULAR SENSING SYSTEM WITH VARIABLE POWER MODE FOR THERMAL MANAGEMENT

CROSS REFERENCE TO RELATED APPLICATION

The present application claims the filing benefits of U.S. provisional application Ser. No. 62/976,574, filed Feb. 14, 2020, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle imaging systems is common and known. Examples of such known systems are described in U.S. Pat. Nos. 6,587,186; 6,710,770 and/or 8,013,780, which are hereby incorporated herein by reference in their entireties.

SUMMARY OF THE INVENTION

The present invention provides a method for managing power of a sensing system (such as a radar or lidar sensing system) for a vehicle. The method includes providing power to each lidar or laser rangefinder of the lidar sensing system. Each lidar includes one or more lidar sensors that is associated with a corresponding field of sensing. The method also includes determining a current velocity or speed of the vehicle and, responsive to determining the current velocity of the vehicle, providing an initial level of electrical power to each lidar sensor. The initial power level may provide at least one selected from the group consisting of (i) an initial range of each lidar sensor and (ii) an initial duty cycle of each lidar sensor. The method includes determining a change in a driving condition of the vehicle and, responsive to determining the change in the driving condition, adjusting the power provided to at least one lidar sensor.

The power provided to the at least one of the lidar sensors thus may be adjusted to adjust a size or duty cycle of the associated fields of sensing. The system may operate to adjust power and thus control temperatures of the sensors for the sensing system (or optionally control temperatures of lidar sensors of a lidar sensing system or radar sensors of a radar sensing system or the like).

These and other objects, advantages, purposes and features of the present invention will become apparent upon review of the following specification in conjunction with the drawings.

DESCRIPTION OF THE PREFERRED EMBODIMENTS

Figure 1:
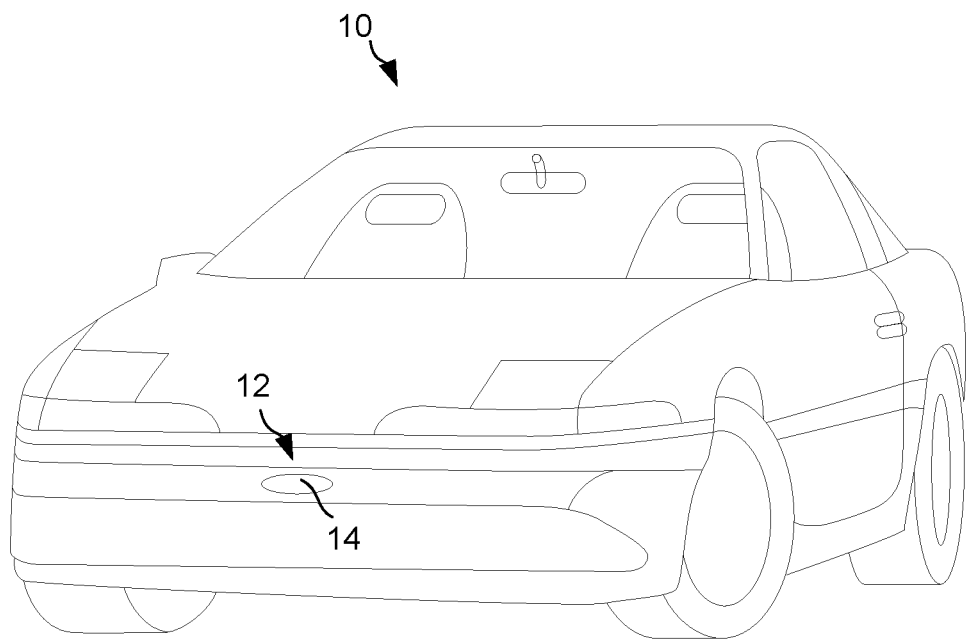
FIG. 1 is a perspective view of a vehicle with a sensing system that incorporates a lidar sensor in accordance with the present invention.

Referring now to the drawings and the illustrative embodiments depicted therein, a vehicle 10 (FIG. 1) includes an driving assistance system or sensing system 12 that includes at least one radar sensor or lidar sensor unit, such as a forward facing lidar sensor unit 14 (and the system may optionally include multiple other exterior facing sensors, such as cameras, radar sensors, or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) that includes electronic circuitry and associated software. The electronic circuitry includes a data processor that is operable to process data captured by the radar or lidar sensor(s) and provided to the control.

The sensing system may also include a radar sensor that includes plurality of transmitters that transmit radio signals via plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from.

The ECU or sensing system 12 may be part of a driving assist system of the vehicle, with the driving assist system controls at least one function or feature of the vehicle (such as to provide autonomous driving control of the vehicle) responsive to processing of the data captured by the radar or lidar sensors. The data transfer or signal communication from the sensor to the ECU may comprise any suitable data or communication link, such as a vehicle network bus or the like of the equipped vehicle.

Figure 2:
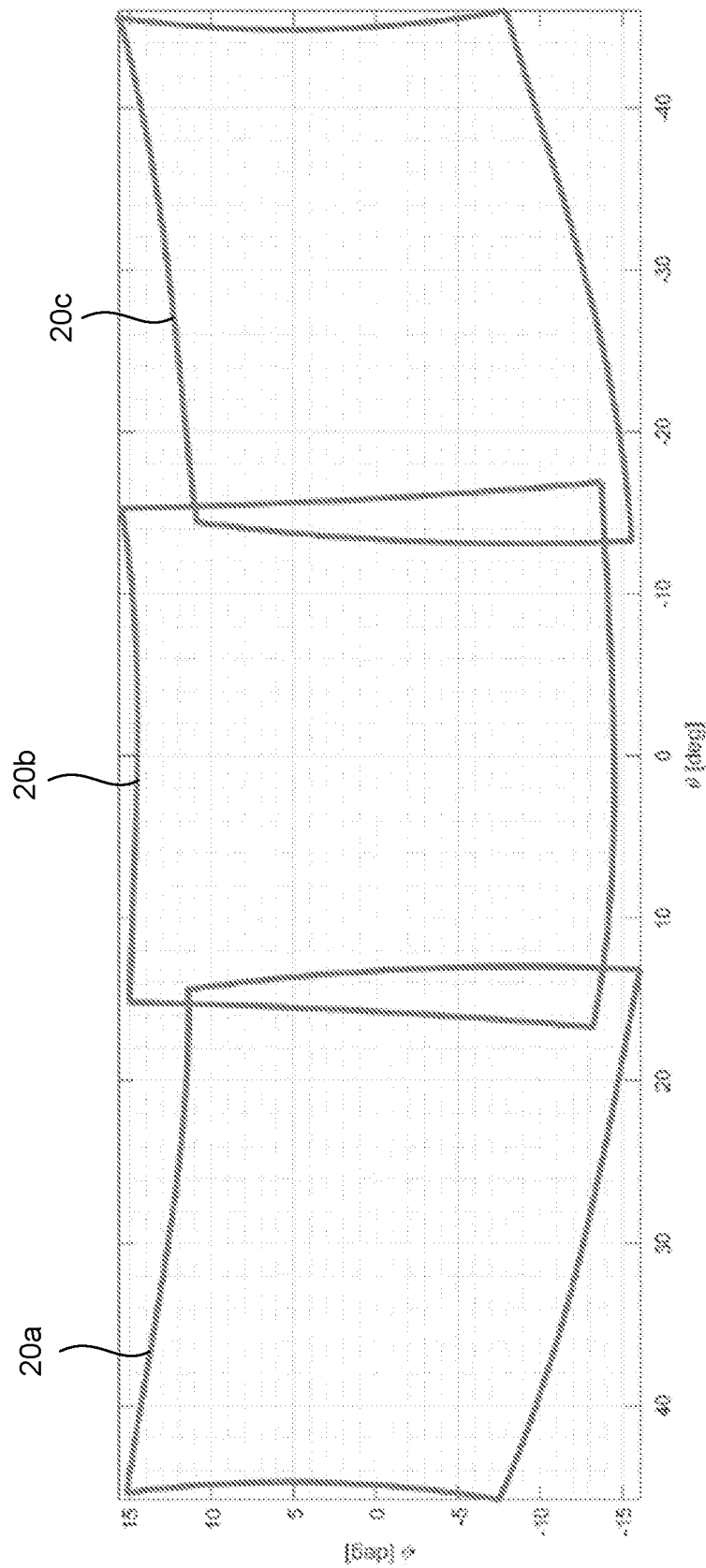
FIG. 2 is a schematic view of a plurality of fields of sensing of a plurality of associated laser rangefinders.

In automotive radar system or lidar systems, thermal management is a significant issue. For example, power consumption of some systems may exceed 17 W before including or integration of computer vision processing (e.g., within a compute module), which may, for example, utilize four laser rangefinder (LRF) sources. Such a system may provide four (or however many LRF sources are desired or appropriate for the particular application) approximately 30 degree field of view or field of sensing (FOV) areas that combine to give a total FOV of 120 degree. Other systems may utilize three LRFs and three micro-electro-mechanical systems (MEMS) mirrors in a single package. This configuration may allow a central zone(s) with approximately 30 to 35 degree FOV (FIG. 2).

In accordance with the present invention, a power management and thermal management system includes a variable power mode as part of an overall thermal management plan. Referring now to FIG. 2, three sensors, such as three radar sensors or three LRFs 20a, 20b, 20c represent detection on respectively left, center, and right zones of, for example, 30 to 35 degree FOVs each. The 30 to 35 degrees is exemplary and the FOVs may be any size such as 20 degrees, 45 degrees, etc. The power management and thermal management system reduces overall power consumption, increases durability of the radar or lidar system (i.e., lifetime of operation), and may reduce maximum heat and energy consumption (in Watts) depending upon the driving scenario. Additionally, longer range detection systems (such as long-range radar sensor (LRR)) may, at least in part, control each LRF's peak power by reducing total power (i.e., energy on target) and duty cycle (i.e., time on target). The power management and thermal management system may actually reduce the power consumed and does not merely sample the returned energy. Conversely, the longer range detection system may temporarily increase each LRF's peak power, thereby providing increased detection range or sensitivity.

For example, when a vehicle is traveling at high speed along a highway (such as at a speed greater than 60 mph), the central area 20b FOV is the most relevant in this scenario. That is, due to the speed and direction of the vehicle, the central area 20b (i.e., the area extending directly in front of the vehicle) requires the greatest range. The system may take into consideration time-to-collision (TTC) proportional to the velocity of the car (relative to stationary targets), and linked to the maximum oncoming traffic speed. For example, the central area 20b may have a range of at least 300 m and the range may be dynamically adapted to a base level set by or responsive to the current vehicle velocity. The range may be increased (i.e., beyond the base level) when oncoming traffic is observed. That is, the power management and thermal management system may adjust the power and duty cycle of one or more LRFs based on the velocity of the vehicle and object detection (i.e., the detection of other vehicles). For example, when the vehicle is travelling at 70 mph, the base level maybe be 300 m, which is less than a maximum range of the system. The base level requires a lower amount of power than the maximum range of the system. However, when the system determines that another vehicle is in front of the equipped vehicle, the system may increase the power in order to increase the range to 350 m. Optionally, the power may be adjusted to increase the range responsive to the vehicle traveling at a greater speed, such as greater than a threshold speed, and/or to decrease the range (to use less power) responsive to the vehicle traveling at a slower speed, such as less than a threshold speed. In another example, when maneuvering along a limited access roadway, the left/right areas 20a, 20c may be filled with information of negligible value and thus power (i.e., range) and/or duty cycle may be reduced. Certain other scenarios (e.g., intersections) may intermittently increase range based on navigation information (e.g., mapping and destination/intention) gathered, for example, from a GPS sensor, V2X (external alerts), or onboard perception observations.

Thus, the system may adjust the range (by adjusting power) and/or duty cycle of one or more regions or FOVs based on vehicle direction, speed, location, or any other environmental condition (e.g., weather, time of day, traffic level, road type, pedestrians, etc.). For example, the system determines that, under the current driving scenario, one or more regions of the FOV may operate at less than maximum range (i.e., less than maximum power) and/or duty cycle. By reducing the range or duty cycle of the one or more FOV sensing regions, the system reduces power drawn by the system and subsequently reduces the amount of heat generated by the system.

The system may dynamically select a range and/or duty cycle for each FOV sensing region based on any number of factors (e.g., vehicle speed, location, road type, traffic, etc.). The selected range may be less than the maximum range and the selected duty cycle may be less than a maximum duty cycle. As the driving situation or environment changes, the system may dynamically adjust the range/duty cycle of each sensing region. For example, when the vehicle speeds up, the range and/or duty cycle of one or more regions may be increased while the range and/or duty cycle of one or more other regions may be reduced. When the vehicle slows down, the range/duty cycle of one or more regions may be reduced while similarly the range/duty cycle of one or more other regions may be increased. As another example, sensing other vehicles (or other objects) may increase/decrease the range and/or duty cycle as appropriate.

Thus, the system may provide electrical power to one or more lidar sensors of a vehicular lidar sensing system (e.g., based on a determined speed of the vehicle as the vehicle travels along a road). The system determines a change in a driving condition and, responsive to the determined change in the driving condition, adjusts electrical power provided to the lidar sensor. Adjusting the electrical power to the lidar sensor may adjust a sensing range and/or a duty cycle of the lidar. The system may provide an initial level of electrical power to the lidar sensor that includes an initial range and/or an initial duty cycle of the lidar/lidar sensor. The change in the driving condition may be based on a change in speed of the vehicle, the detection and/or speed of other vehicles or objects, a change in temperature of the lidar, a change in the road type of the road along which the vehicle is traveling, a change in the weather conditions at the vehicle, etc. The system may include a controller that receives electrical power from a power source of the vehicle (e.g., a battery) and proportionally provides the electrical power to the lidar/lidar sensor(s) based on the received electrical power from the power source. The controller may determine the speed of the vehicle via, for example, a wheel speed sensor of the vehicle, GPS, etc.

The vehicle may include any type of sensor or sensors, such as imaging sensors or radar sensors or lidar sensors or ultrasonic sensors or the like. The system may include an imaging sensor or camera that captures image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535;

US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar or lidar sensors or the like. The sensing system may utilize aspects of the systems described in U.S. Pat. Nos. 9,761,142; 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321, 111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for managing electrical power consumption of a vehicular lidar sensing system, the method comprising:
    equipping a vehicle with the vehicular lidar sensing system, wherein the vehicular lidar sensing system comprises a lidar disposed at the vehicle, wherein the lidar has a field of sensing exterior of the vehicle and comprises a lidar sensor;
    determining speed of the vehicle as the vehicle travels along a road;
    as the vehicle travels along the road, providing electrical power to the lidar sensor of the vehicular lidar sensing system;
    wherein providing electrical power to the lidar sensor comprises providing an initial level of electrical power to the lidar sensor based on the determined speed of the vehicle;
    determining a change in a driving condition of the vehicle as the vehicle travels along the road;
    responsive to determining the change in the driving condition, adjusting electrical power provided to the lidar sensor;
    wherein the vehicular lidar sensing system comprises a forward sensing vehicular lidar sensing system with the lidar having a field of sensing forward of the vehicle;
    wherein the vehicular lidar sensing system comprises a plurality of lidars each having a respective field of sensing forward of the vehicle, and wherein the plurality of lidars of the forward sensing vehicular lidar sensing system comprises a left lidar, a central lidar, and a right lidar; and
    wherein determining the change in the driving condition comprises determining that a current speed of the vehicle is above a threshold level, and wherein adjusting the electrical power provided to the lidar sensor comprises reducing the power provided to a lidar sensor of the left lidar and a lidar sensor of the right lidar and increasing the power provided to a lidar sensor of the central lidar.

2. The method of claim 1, wherein adjusting the electrical power provided to the lidar sensor increases a sensing range of the lidar.

3. The method of claim 1, wherein adjusting the electrical power provided to the lidar sensor adjusts a duty cycle of the lidar.

4. The method of claim 1, wherein determining the change in the driving condition comprises determining a speed of another vehicle relative to the vehicle.

5. The method of claim 1, wherein the vehicular lidar sensing system comprises a long-range lidar sensor, and wherein adjusting the electrical power provided to the lidar sensor is responsive to the long-range lidar sensor detecting an object.

6. The method of claim 1, wherein providing the initial level of electrical power to the lidar sensor based on the determined speed of the vehicle comprises setting an initial range and an initial duty cycle of the lidar sensor.

7. The method of claim 1, wherein the field of sensing of the lidar is greater than 30 degrees.

8. The method of claim 1, wherein determining the change in the driving condition comprises determining that the vehicle is traveling along a limited access roadway, and wherein adjusting the electrical power provided to the lidar sensor comprises, responsive to determining that the vehicle is traveling along a limited access roadway, reducing the electrical power provided to the lidar sensor.

9. The method of claim 8, wherein determining that the vehicle is traveling along a limited access roadway comprises obtaining vehicle location information from a GPS sensor.

10. The method of claim 8, wherein determining that the vehicle is traveling along a limited access roadway comprises capturing image data via at least one camera disposed at the vehicle and processing the captured image data.

11. The method of claim 1, wherein adjusting the electrical power provided to the lidar sensor is based on a determined change in speed of the vehicle.

12. The method of claim 1, wherein determining the change in the driving condition comprises determining a change in a temperature of the lidar.

13. The method of claim 1, wherein providing electrical power to the lidar comprises controlling an amount of electrical power provided to the lidar sensor via an electronic control unit (ECU) of the vehicular lidar sensing system.

14. The method of claim 13, wherein the ECU receives electrical power from a power source of the vehicle and provides the electrical power to the lidar sensor based on the received electrical power from the power source.

15. The method of claim 1, wherein determining the speed of the vehicle comprises determining the speed of the vehicle via a wheel speed sensor of the vehicle.

16. A vehicular power management system, the vehicular power management system comprising:
a forward sensing vehicular lidar sensing system comprising a plurality of lidars each having a respective field of sensing forward of a vehicle, and wherein the plurality of lidars of the forward sensing vehicular lidar sensing system comprises a left lidar, a central lidar, and a right lidar;
wherein each of the left lidar, the central lidar, and the right lidar comprises a respective lidar sensor;
an electronic control unit (ECU) comprising electronic circuitry and associated software;
wherein the ECU determines speed of the vehicle as the vehicle travels along a road;
wherein the ECU, as the vehicle travels along the road, provides an initial amount of electrical power to respective lidar sensors of the plurality of lidars based on the determined speed of the vehicle;
wherein the ECU determines a change in a driving condition of the vehicle as the vehicle travels along the road;
wherein the ECU, responsive to determining the change in the driving condition, adjusts electrical power provided to the respective lidar sensors; and
wherein determining the change in the driving condition comprises determining that a current speed of the vehicle is above a threshold level, and wherein adjusting the electrical power provided to the respective lidar sensors comprises reducing the power provided to the lidar sensor of the left lidar and the lidar sensor of the right lidar and increasing the power provided to the lidar sensor of the central lidar.

17. The vehicular power management system of claim 16, wherein the ECU adjusts the electrical power provided to the respective lidar sensors to increase a sensing range of the respective lidars.

18. The vehicular power management system of claim 16, wherein the ECU adjusts the electrical power provided to the respective lidar sensors to adjust a duty cycle of the respective lidars.

19. The vehicular power management system of claim 16, wherein the ECU determines the change in the driving condition based on determining a speed of another vehicle relative to the vehicle.

20. The vehicular power management system of claim 16, wherein the forward sensing vehicular lidar sensing system comprises a long-range lidar sensor, and wherein the ECU adjusts the electrical power provided to the respective lidar sensors responsive to the long-range lidar sensor detecting an object.

21. The vehicular power management system of claim 16, wherein the ECU provides the initial amount of electrical power to the respective lidar sensors based on setting an initial range and an initial duty cycle of the respective lidar sensors.

22. The vehicular power management system of claim 16, wherein the field of sensing of at least one lidar of the plurality of lidars is greater than 30 degrees.

23. The vehicular power management system of claim 16, wherein the ECU determines the change in the driving condition based on determining that the vehicle is traveling along a limited access roadway, and wherein the ECU adjusts the electrical power provided to the respective lidar sensors responsive to determining that the vehicle is traveling along a limited access roadway.

24. The vehicular power management system of claim 16, wherein the ECU determines that the vehicle is traveling along a limited access roadway based on obtaining vehicle location information from a GPS sensor.

25. The vehicular power management system of claim 16, wherein the ECU determines that the vehicle is traveling along a limited access roadway based on image data captured via at least one camera disposed at the vehicle.

26. A method for managing electrical power consumption of a forward sensing vehicular lidar sensing system, the method comprising:
equipping a vehicle with the forward sensing vehicular lidar sensing system, wherein the forward sensing vehicular lidar sensing system comprises a plurality of lidars each having a respective field of sensing forward of the vehicle, and wherein the plurality of lidars of the forward sensing vehicular lidar sensing system comprises a left lidar, a central lidar, and a right lidar, and wherein each of the left lidar, the central lidar, and the right lidar comprises a respective lidar sensor;
determining speed of the vehicle as the vehicle travels along a road;
as the vehicle travels along the road, providing an initial amount of electrical power to each respective lidar sensor of the plurality of lidars based on the determined speed of the vehicle;
determining a change in a driving condition of the vehicle as the vehicle travels along the road;
responsive to determining the change in the driving condition, adjusting electrical power provided to the respective lidar sensors; and
wherein determining the change in the driving condition comprises determining that a current speed of the vehicle is above a threshold level, and wherein adjusting the electrical power provided to the respective lidar sensors comprises reducing the power provided to the lidar sensor of the left lidar and the lidar sensor of the right lidar and increasing the power provided to the lidar sensor of the central lidar.

27. The method of claim 26, wherein adjusting the electrical power provided to the respective lidar sensors increases a sensing range of at least one lidar sensor of the respective lidar sensors.

28. The method of claim 26, wherein adjusting the electrical power provided to the respective lidar sensors adjusts a duty cycle of at least one lidar sensor of the respective lidar sensors.

* * * * *